(12) United States Patent
Herbig et al.

(10) Patent No.: US 11,575,990 B2
(45) Date of Patent: *Feb. 7, 2023

(54) COMMUNICATION SYSTEM FOR MULTIPLE ACOUSTIC ZONES

(71) Applicant: Cerence Operating Company, Burlington, MA (US)

(72) Inventors: Tobias Herbig, Ulm (DE); Markus Buck, Biberach (DE); Meik Pfeffinger, Ulm (DE)

(73) Assignee: Cerence Operating Company, Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/583,189

(22) Filed: May 1, 2017

(65) Prior Publication Data

US 2017/0251304 A1 Aug. 31, 2017

Related U.S. Application Data

(63) Continuation of application No. 13/346,854, filed on Jan. 10, 2012, now Pat. No. 9,641,934.

(51) Int. Cl.
*H04R 3/12* (2006.01)
*H04M 9/08* (2006.01)
(Continued)

(52) U.S. Cl.
CPC ............ *H04R 3/12* (2013.01); *G10L 21/0208* (2013.01); *G10L 25/84* (2013.01); *H04M 9/082* (2013.01);
(Continued)

(58) Field of Classification Search
CPC ............ G10L 15/22; G10L 2021/02166; G10L 2015/223; G10L 2015/228; G10L 13/02;
(Continued)

(56) References Cited

U.S. PATENT DOCUMENTS

| | | | |
|---|---|---|---|
| 4,944,018 A * | 7/1990 | Bose | H03G 3/32 381/102 |
| 5,208,866 A | 5/1993 | Kato et al. | |

(Continued)

FOREIGN PATENT DOCUMENTS

| | | |
|---|---|---|
| EP | 0 903 726 A2 | 3/1999 |
| EP | 1 475 997 A2 | 11/2004 |
| EP | 2 018 034 A1 | 1/2009 |

OTHER PUBLICATIONS

Extended European Search Report dated Nov. 6, 2017 from Application No. 17183121.7; 6 Pages.
(Continued)

*Primary Examiner* — Mark Villena
(74) *Attorney, Agent, or Firm* — Occhiuti & Rohlicek LLP

(57) ABSTRACT

An communication system supports communication paths within an environment by receiving speech signals of a speaker and playing it back for one or more listeners. Signal processing tasks are split into a microphone related part and into a loudspeaker related part. A sound processing system suitable for use in an environment having multiple acoustic zones includes a plurality of microphone communication instances coupled and a plurality of loudspeaker instances.

19 Claims, 10 Drawing Sheets

(51) Int. Cl.
*H04R 1/40* (2006.01)
*H04R 3/02* (2006.01)
*H04R 3/00* (2006.01)
*G10L 21/0208* (2013.01)
*G10L 25/84* (2013.01)
*H04R 27/00* (2006.01)
*H04R 5/02* (2006.01)

(52) U.S. Cl.
CPC ............. *H04R 1/406* (2013.01); *H04R 3/005* (2013.01); *H04R 3/02* (2013.01); *H04R 27/00* (2013.01); *G10L 2021/02082* (2013.01); *H04R 5/02* (2013.01); *H04R 2201/403* (2013.01); *H04R 2227/001* (2013.01); *H04R 2227/009* (2013.01); *H04R 2410/05* (2013.01); *H04R 2420/01* (2013.01); *H04R 2499/13* (2013.01)

(58) Field of Classification Search
CPC ....... G10L 15/30; H04R 5/02; H04R 2499/13; H04R 1/26; H04R 2201/403; H04R 2205/024; H04R 2430/20; H04R 1/2834; B60R 16/0373
See application file for complete search history.

(56) References Cited

U.S. PATENT DOCUMENTS

| | | | |
|---|---|---|---|
| 5,406,492 A * | 4/1995 | Suzuki | G01C 21/3629 340/996 |
| 8,275,145 B2 | 9/2012 | Buck et al. | |
| 9,641,934 B2 | 5/2017 | Herbig et al. | |
| 2002/0071573 A1* | 6/2002 | Finn | G10L 21/0208 381/93 |
| 2002/0189881 A1* | 12/2002 | Mathias | B60R 1/00 180/271 |
| 2005/0040935 A1 | 2/2005 | Ewert et al. | |
| 2005/0058278 A1 | 3/2005 | Gallego Hugas et al. | |
| 2005/0265560 A1 | 12/2005 | Haulick et al. | |
| 2007/0053524 A1* | 3/2007 | Haulick | H04M 9/082 381/92 |
| 2007/0127734 A1 | 6/2007 | Brulle-Drews | |
| 2007/0280486 A1 | 12/2007 | Buck et al. | |
| 2008/0031468 A1* | 2/2008 | Christoph | G10K 11/178 381/71.2 |
| 2008/0049948 A1 | 2/2008 | Christoph et al. | |
| 2008/0147321 A1 | 6/2008 | Howard et al. | |
| 2008/0292116 A1* | 11/2008 | Wu | H03F 3/217 381/120 |
| 2009/0022330 A1 | 1/2009 | Haulick et al. | |
| 2009/0034752 A1* | 2/2009 | Zhang | H04R 3/005 381/92 |
| 2009/0055178 A1* | 2/2009 | Coon | B60R 16/0373 704/246 |
| 2009/0097679 A1* | 4/2009 | Maeda | H04S 3/008 381/302 |
| 2010/0035663 A1* | 2/2010 | Haulick | H04M 1/6083 455/569.2 |
| 2010/0040242 A1 | 2/2010 | Yamaguchi | |
| 2010/0098265 A1* | 4/2010 | Pan | G10K 11/178 381/94.1 |
| 2010/0158263 A1* | 6/2010 | Katzer | G10K 11/175 381/73.1 |
| 2010/0189275 A1* | 7/2010 | Christoph | H04R 3/005 381/66 |
| 2010/0202631 A1 | 8/2010 | Short | |
| 2011/0058684 A1 | 3/2011 | Ohta et al. | |
| 2011/0081032 A1 | 4/2011 | Soulodre | |
| 2011/0103590 A1 | 5/2011 | Christoph et al. | |
| 2011/0211705 A1 | 9/2011 | Hutt | |
| 2011/0216916 A1 | 9/2011 | Hera et al. | |
| 2014/0337016 A1* | 11/2014 | Herbig | H04M 3/568 704/201 |

OTHER PUBLICATIONS

Ortega, et al., "Cabin Car Communication System to Improve Communications Inside a Car", Dept. of Electronics Engineering and Communications, IEEE 2002; IV-3836-3839, University of Zaragoza, Spain, Sep. 2002; (4 pages).

Schmidt, G. and Haulick, T., "Signal Processing for In-Car Communication System", May 6, 2005, Harman/Becker Automotive Systems, Temic SDS, Research Dept. Division Acoustics (22 pages).

EP Application No. 13 15 0871. European Search Report, date of completion Dec. 2, 2015, 2 pages.

European Patent Application No. 13150871.5; Response to Office Action filed Jul. 7, 2016, 12 pages.

European Intention to Grant (with allowed specification and claims) dated Feb. 7, 2017; for European Pat. App. No. 13150871.5; 37 pages.

Non-Final Office Action dated Apr. 2, 2015; for U.S. Appl. No. 13/346,854; 24 pages.

Response filed on Jun. 23, 2015 to Non-Final Office Action dated Apr. 2, 2015; for U.S. Appl. No. 13/346,854; 11 pages.

Final Office Action dated Oct. 7, 2015; for U.S. Appl. No. 13/346,854; 31 pages.

Response with RCE dated Jan. 6, 2017 to Final Office Action dated Oct. 7, 2015; for U.S. Appl. No. 13/346,854; 15 pages.

Non-Final Office Action dated Apr. 12, 2016; for U.S. Appl. No. 13/346,854; 37 pages.

Response filed on Apr. 28, 2016 to Non-Final Office Action dated Apr. 12, 2016; for U.S. Appl. No. 13/346,854; 14 pages.

Final Office Action dated Aug. 16, 2016; for U.S. Appl. No. 13/346,854; 41 pages.

Notice of Appeal filed Aug. 22, 2016; for U.S. Appl. No. 13/346,854; 2 pages.

Appeal Brief filed Aug. 25, 2016; for U.S. Appl. No. 13/346,854; 25 pages.

Notice of Non-Compliant Appeal Brief dated Sep. 23, 2016; for U.S. Appl. No. 13/346,854; 2 pages.

Response filed Sep. 26, 2016 to Notice of Non-Compliant Appeal Brief dated Sep. 23, 2016; for U.S. Appl. No. 13/346,854; 27 pages.

Notice of Allowance dated Jan. 13, 2017; for U.S. Appl. No. 13/346,854; 10 pages.

Response to European Office Action dated Jan. 4, 2018 for European Application No. 17183121.7; Response filed Jun. 12, 2018; 7 pages.

* cited by examiner

COMMUNICATION SYSTEM FOR MULTIPLE ACOUSTIC ZONES

CROSS-REFERENCE TO RELATED APPLICATION

The present application is a continuation of U.S. patent application Ser. No. 13/346,854, entitled: "IN-CAR COMMUNICATION SYSTEM FOR MULTIPLE ACOUSTIC ZONES" which was filed on Jan. 10, 2012, which is incorporated herein by reference in its entirety.

BACKGROUND OF THE INVENTION

Due to a large amount of background noise, the communication within a car driving at high or even moderate speeds is often difficult. This is especially true if one of the communication partners is the driver and the other is one of the backseat passengers. As a result of the high noise level, the backseat passengers often lean towards the driver or other front passengers. Furthermore, speakers sometime attempt to overcome the noise levels by speaking louder. Even if both of these responses to the noise enhance the quality of the "communication channel" it is exhausting and uncomfortable for the backseat passengers to continue to lean forward and speak louder for extended periods of time. The situation can be improved by using in-car communication (ICC) systems. These systems receive the speech of each passenger by means of a single microphone or with an array of microphones. The received signals of the speaking passenger are processed by the system and played back via loudspeakers which are located close to the non-speaking passengers. Comparable to public address systems, in-car communication systems operate within a closed electro-acoustic loop. Thus, signal processing is used to guarantee stable operation so as to avoid acoustic feedback which results in artifacts such as howling or whistling.

In-Car Communication systems are implemented to support the communication between passengers in adverse automotive environments. The communication between driver and passengers in the rear seats may be strongly disturbed by background noises caused by the tires of the car, the sound of the engine, wind noises or passing cars. Furthermore, the driver has to concentrate on road traffic and therefore cannot turn toward the listener in the rear seat. Since the driver generally speaks towards the windshield, the sound perceived by passengers in the rear of the car is significantly attenuated. Speech intelligibility is additionally degraded by background noise. Therefore, conventional approaches for In-Car Communication systems use microphones to receive the driver's speech signal perform speech enhancement to reduce background noises and amplify the speech signal before the signal is played back in the rear of the car. The reverse communication channel may be supported as well by using microphones close to the passenger in the rear seat and additional loudspeakers in the front of the car. The first case may be viewed as a unidirectional and the second one as a bidirectional ICC system. Bidirectional systems are conventionally implemented using two ICC instances operated in parallel to avoid unstable amplification within the closed loop of both ICC instances. An "instance" generally means a set of executable processor instructions (e.g., signal processing chain instructions), a software thread, firmware or hardware.

FIG. 1 shows a conventional implementation of a bidirectional ICC system using two ICC signal processing chains. Signal processing includes processing tasks such as noise reduction, equalization and notch filtering (for suppressing feedback). Details of these signal processing tasks can be found in "Signal Processing for In-Car Communication Systems" by Gerhard Schmidt and Tim Haulick, Chapter from "Topics in Acoustic Echo and Noise Control, 2006, Springer Berlin Heidelberg pp 547-598, (referred to herein as "Schmidt and Haulick") and incorporated by reference in its entirety.

Up to now conventional ICC systems have been successfully implemented only for two acoustic zones, (e.g. for supporting the communication between the front passengers (front zone) and the passengers on the backseat (rear zone)). During operation, sound reinforcement in such a system bears the risk of going unstable due to signal echo coupling back into the microphones. Each ICC processing chain contains two mechanisms to avoid howling artifacts resulting from such instability: a notch filter that suppresses howling artifacts in the signal (e.g., feedback suppression in Schmidt and Haulick, pp. 571-573) and a loss control mechanism to guarantee that both directions are not open at the same time to avoid unstable operation in a closed loop (e.g., see Attenuation Control in Schmidt and Haulick, p. 578). However, when there are multiple acoustic zones, in general the signals that come from one acoustic zone are played back into all other acoustic zones (except for the zone with the active speaker). With M input channels and N output channels there are for each of the M input channels N−1 output channels that have to be supported. This results in M·(N−1) paths that have to be considered and processed. Computations are needed for each acoustic path from each microphone to each loudspeaker to provide specific equalizer settings. In conventional systems this results in M·(N−1) equalizers that have to be computed where M is the number of microphones and N is the number of loudspeakers. In conventional systems, the notch filter is calculated for each signal processing chain. These computations are expensive in terms of processor resources. Therefore the cost to support multiple acoustic zones would be prohibitive for most mass market vehicles.

BRIEF DESCRIPTION OF INVENTION

An In-Car Communication (ICC) system supports the communication paths within a car by receiving the speech signals of a speaking passenger and playing it back for one or more listening passengers. Signal processing such as noise reduction, equalization and notch filtering (for suppressing feedback) is necessary to achieve improved speech intelligibility in the car while ensuring a stable operation without howling. Embodiments disclosed herein, describe ICC sound processing systems where two or more acoustic zones are supported in an efficient manner. Signal processing tasks are split into a microphone related part (Mic-ICC) and into a loudspeaker related part (Ls-ICC). In contrast to conventional systems loss control is not realized in each signal processing chain (referred to as an "instance") but in a global module. In one embodiment, N acoustic zones can be supported with M Mic-ICC instances and N Ls-ICC instances. In the processing chain there is a dynamic audio routing matrix that passes the active speaker channels to the appropriate loudspeakers. The system obtains information from the individual Mic-ICC instances and adjusts a set of matrix weights dynamically.

In one embodiment, a sound processing system suitable for use in a vehicle having a plurality of microphones and a plurality of loudspeakers distributed in multiple acoustic zones includes a plurality of microphone In-Car Communication (Mic-ICC) instances coupled to corresponding ones of the plurality of microphones, a plurality of loudspeaker In-Car Communication (Ls-ICC) instances coupled to corresponding ones of the plurality of loudspeakers and a dynamic audio routing matrix. The dynamic audio routing matrix includes a controller and coupled to the plurality of Mic-ICC instances, a mixer coupled to the plurality of Mic-ICC instances and a distributor coupled to the plurality of Ls-ICC instances. Such a system has several advantages over conventional systems. The interaction of the different ICC instances is controlled in a single module by the dynamic audio routing matrix making the system more manageable. The split ICC instances (Mic and Ls) allow for further optimizations to substantially reduce the computational power required to process the signals in real time. In this embodiment, the dynamic audio routing matrix replaces the multiple loss controls tasks (sometime referred to as gain control tasks or attenuation control tasks) in each of the multiple conventional ICC instances. Here, the dynamic audio routing matrix and mixer act as multiple loss controllers.

For each acoustic path from each microphone to each loudspeaker a specific equalizer setting is necessary. In conventional systems this results in: $M \cdot (N-1)$ equalizers that have to be computed; where M is the number of Mic-ICC instances; and N is the number of number of Ls-ICC instances.

A technique for providing speech intelligibility in a vehicle having a plurality of microphones and a plurality of loudspeakers distributed in multiple acoustic zones includes the steps of processing speech from the plurality of microphones using a corresponding plurality of microphone In-Car Communication (Mic-ICC) instances, analyzing signals from the plurality of Mic-ICC instances, detecting speech and determining active acoustic path, calculating weights for the plurality of Mic-ICC instances based on speech and active acoustic paths, applying the calculated weights to provide weighted audio signals and distributing the weighted audio signals to a plurality of loudspeaker ICC (Ls-ICC) instances coupled to corresponding ones of the plurality of loudspeakers. With such a technique, only those equalizers which correspond to the acoustic path that is active at any given time need be calculated. The system requires only $N-1$ equalizers to be processed instead of $M \cdot (N-1)$ in conventional systems.

In another aspect of the invention, a technique includes mapping a plurality of input channels formed by the plurality of microphones and corresponding Mic-ICC instances to at least one selected channel and distributing the at least one selected channel signal from the at least one selected channel to the plurality of loud-speakers through the corresponding plurality of Ls-ICC instances. Such a technique allows for a single notch filter to be calculated instead of a notch filter for each ICC instance. This optimization in embodiments according to aspects of the invention provides efficient integration of a notch filter into the dynamic audio routing matrix. The notch filter is, in general, the most expensive algorithm in terms of CPU and memory. In these embodiments, the audio routing matrix is split into two vectors: an input weighting vector (mixer) that maps M input channels to one single channel and an output distributing vector (distributor) that distributes one single signal to multiple output channels. In between, a single notch filter can be integrated. In other words, the notch filter has to be calculated only once instead of N times. In these embodiments, the dynamic audio routing matrix further includes a controller coupled to the input mixer and to the output distributor. The Mic-ICC instances are each coupled to the input mixer and the plurality of Ls-ICC instances are coupled to the output distributor. In one embodiment, the optimized sound processing system can efficiently support two, three, four, five, six or more acoustic zones.

Alternate configurations of the invention include a multiprogramming or multiprocessing computerized device such as a vehicle on board computer or dedicated computing signal processing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

An In-Car Communication (ICC) sound processing system supports communication paths within a vehicle by receiving speech from a speaker through microphones, processing the speech and reproducing the speech using loudspeakers for listeners in the vehicle. Signal processing tasks such as noise reduction, equalization and notch filtering (for suppressing feedback) are necessary to achieve improved speech intelligibility in the car while ensuring a stable operation without howling and other artifacts. Up to now, conventional ICC systems have only been successfully implemented for two acoustic zones (e.g., supporting communication between the front passengers and driver (in a front acoustic zone) and the passengers in the backseat (in a rear acoustic zone). Such conventional bidirectional systems have been implemented with two separate ICC instances operating in both directions: from front to rear and from rear to front. Such operation is computationally intensive and is difficult to apply to more than two acoustic zones. Embodiments of the present invention split the ICC instances into a microphone portion and loudspeaker portion resulting in a sound processing system which is more efficient than a conventional system and which can support multiple acoustic zones.

Figure 1:
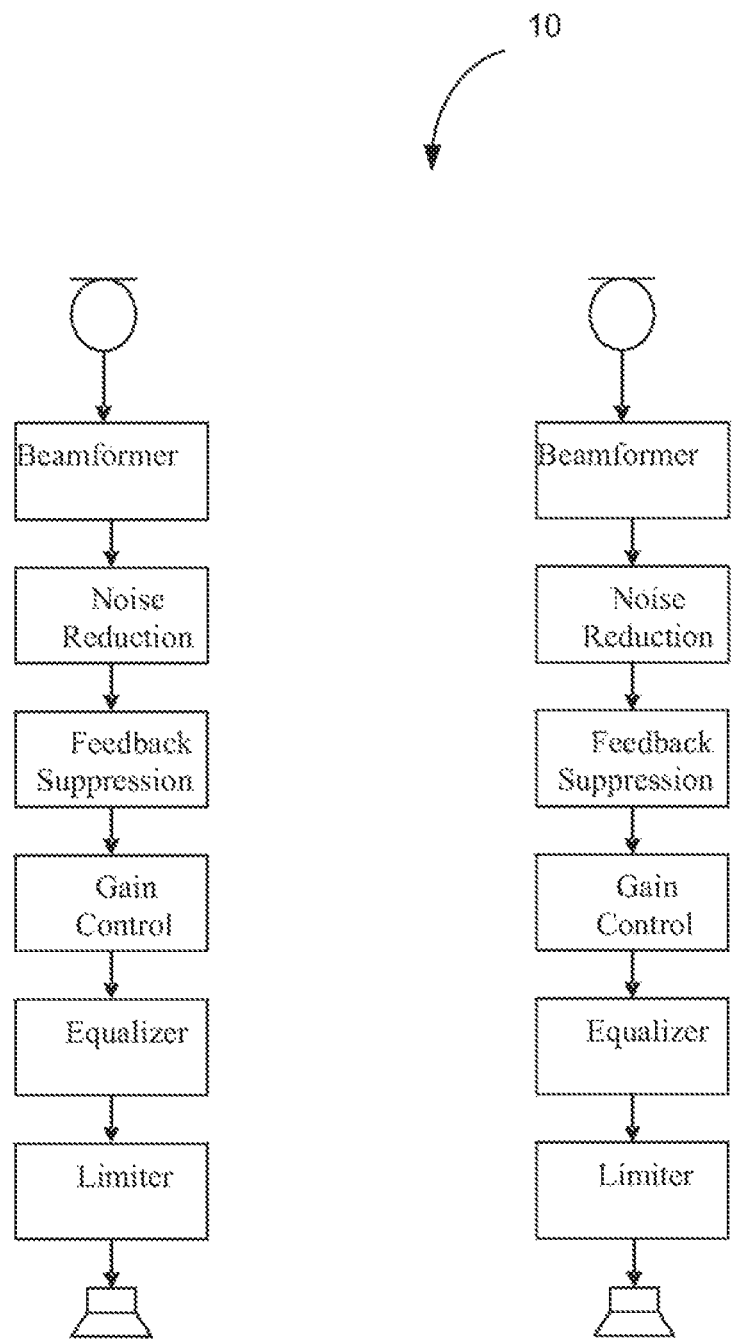
FIG. 1, shows a flow diagram of prior art ICC processing chains as configured for a bidirectional system.
Figure 2:
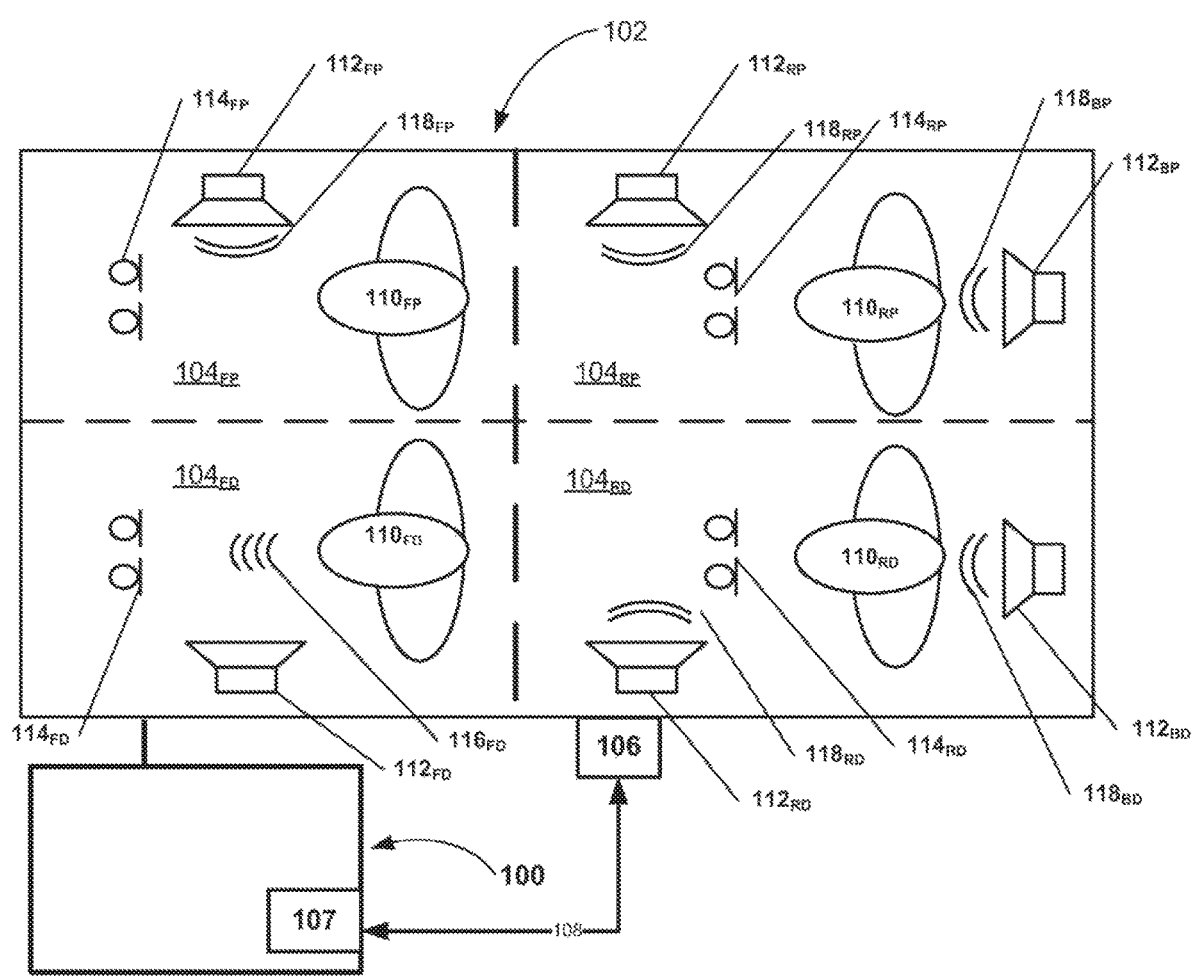
FIG. 2 shows a schematic diagram of an In-Car Communication (ICC) system for multiple acoustic zones in a sedan according to one aspect of the invention.

Now referring to FIG. 2, a sound processing system 100 suitable for use in a vehicle 102 having a plurality of microphones $114_{FD}$-$114_{RP}$ (collectively referred to as microphones 114) and a plurality of loudspeakers $112_{FD}$-$112_{RP}$ (collectively referred to as loudspeakers 112) distributed in multiple acoustic zones $104_{FD}$-$104_{RP}$ (collectively referred to as acoustic zones 104) receives signals from the microphones 114, processes the microphone signals (here $116_{FD}$) and outputs digitally processed signals through loudspeakers 112 to passengers $110_{FP}$, $110_{RD}$ and $110_{RP}$. For the microphones 114, loudspeakers 112 and multiple acoustic zones 104 in FIG. 2, the subscript references refer to the following positions within the vehicle 102:

D driver side;
P passenger side;
F front seats;
R rear seats; and
B behind rear seats.

In one embodiment, the sound processing system 100 further includes an on-board computer interface 107 which can communicate over the car area network (CAN bus) 108 with the vehicle's 102 on-board computer 106.

FIG. 2 depicts a scenario where the driver $110_{PD}$ is speaking. It is noted that the some sound may be output through loudspeaker $112_{FD}$, but this will generally be at a much reduced level. In this example, the driver $110_{FD}$ is speaking (as indicated by signals $116_{FD}$) into microphone $114_{FD}$. The sound processing system 100 receives the signals from microphone $114_{FD}$, processes the signals and sends the signals to loudspeakers in the three other acoustic zones $104_{FP,RP\ and\ RD}$ to produce sound for the passengers.

Additional information, for example, about passengers, vehicle speed and other information which might affect communication within the vehicle can be obtained by the sound processing system 100 by means of the on-board computer interface 107 which can communicate over the car area network (CAN bus) 108 with the vehicle's 102 on-board computer 106.

Figure 3:
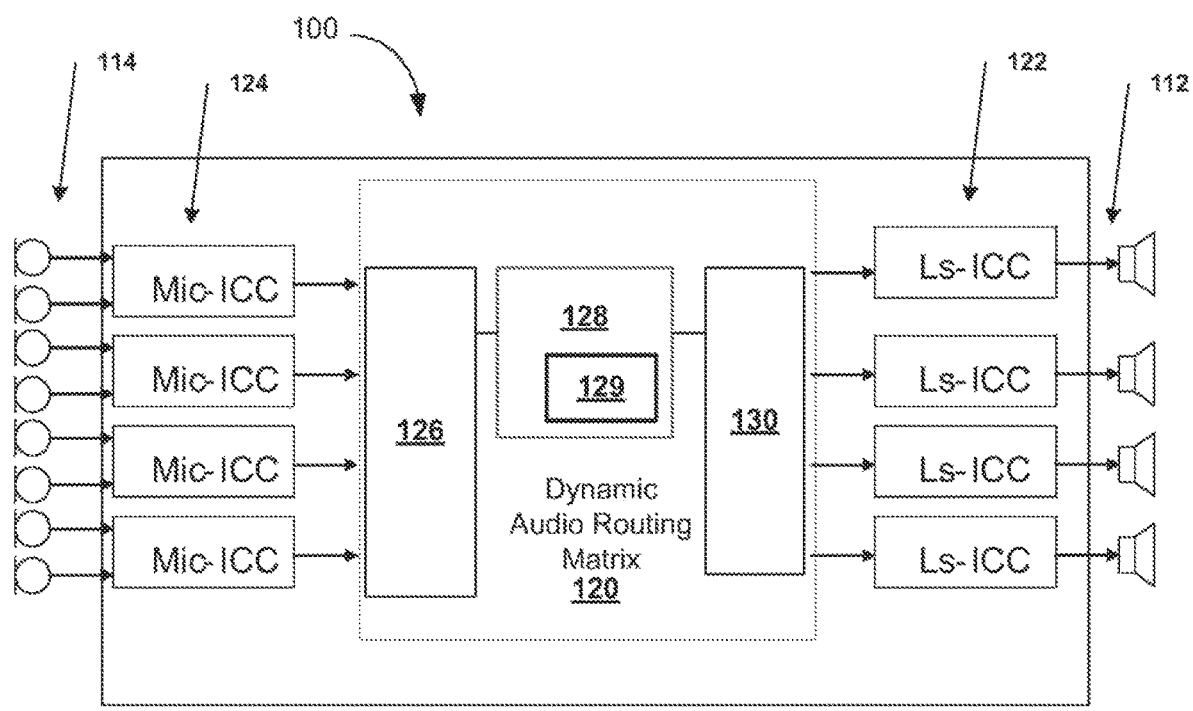
FIG. 3 shows a schematic diagram of a dynamic audio routing matrix of the ICC system of FIG. 2.

Now referring to FIG. 3, the sound processing system 100 of FIG. 2 includes a plurality of microphone In-Car Communication (Mic-ICC) instances 124 (or simply Mic-ICC 124) coupled to microphones and a plurality of loudspeaker ICC (Ls-ICC) instances 122 (or simply Ls-ICC 122) coupled to corresponding ones of the plurality of loudspeakers 112. The sound processing system 100 further includes a dynamic audio routing matrix 120 having a mixer 126 (also referred to as a weighting module 126) coupled to the plurality of microphone ICC (Mic-ICC) instances 124, a controller 128 coupled to mixer 126 and a distributor 130 coupled to the plurality of Ls-ICC instances 122. The controller 128 includes an adaptive gain controller 129.

Here, ICC instances are split into a microphone related part (Mic-ICC) 124 and into a loudspeaker related part (Ls-ICC) 122. In contrast to conventional systems the controller is not realized in each instance but in a global module, the dynamic audio routing matrix 120. In a system having N acoustic zones, the signal processing can be supported with M Mic-ICC 124 instances and N Ls-ICC 122 instances. The dynamic audio routing matrix 120 separates the microphones 114 and Mic-ICC 124 instances from the loudspeakers 112 and the Ls-ICC 122 instances. The dynamic audio routing matrix 120 replaces several loss controllers in what would have been several combined ICC instances.

In operation, controller 128 obtains signal information from the individual Mic-ICC instances 124 and determines and dynamically adjusts matrix weights in the mixer 126 and thereby effectively determines the active Mic-ICC instance 124. The matrix weights are then applied by the weighting module 126 to pass signals from the active Mic-ICC instance 124 through the distributor 130 to the Ls-ICC instances 122 to operate the loudspeakers 112 which provide sound in the corresponding acoustic zone. The adaptive gain controller 129 adjusts playback level to compensate for current noise levels in the vehicle by adjusting a playback level for each Ls-ICC 122 individually to compensate for current noise levels in the corresponding acoustic zone. Alternatively, gain compensation can be performed within the individual Ls-ICC instances 122 instead of the dynamic routing matrix 120.

By separating ICC processing for incoming microphone signals and enhanced speech signals to be played back via the vehicles loudspeakers, the sound processing system 100 efficiently supports several communication paths. The Mic-ICC 124 instances receive the microphone signals from microphones in corresponding acoustic zone and may perform high pass filtering, beam forming, noise reduction and gain control to compensate for varying speech levels. Each Mic-ICC 124 instance provides an enhanced single-channel speech signal. The controller 128 within the dynamic audio routing matrix 120 identifies which acoustic zone is active in order to pass through the corresponding input signal. The signals originating from inactive acoustic zones are suppressed by the mixer 126. Control of the input signals may be realized either by binary decisions or by a soft weighting of the signals. The Ls-ICC 122 instances receive the signals from the distributor 130 and may perform equalizer, signal limiter and gain control operations to scale the play back level depending on the level of the background noise. Each Ls-ICC 122 instance provides the output signal for one or more loudspeakers 112. The controller 128 within the dynamic audio routing matrix 120 sets the weights for the distributor 130 to provide sufficient gain for speech communication in all acoustic zones 104. This may be realized either by binary decisions (e.g., on or off) or by a soft weighting of the signals. In particular, for the different acoustic zones 104 the distributor 130 uses different weighting factors in order to adjust the gain level for each specific acoustic zones.

In one embodiment, the delay to reproduce speech from microphones 114 to speakers 112 is limited to be a maximum of 10 ms to reduce echo artifacts. In another embodiment, the number of Mic-ICCs 124 is equal to the number of Ls-ICCs 122. It is understood that each acoustic zone may contain more than one microphone generating signals to be processed by the corresponding Mic-ICC and that more than one loudspeaker may be addressed by an Ls-ICC (e.g., loudspeakers $112_{RD}$ and $112_{BD}$ in acoustic zone $104_{RD}$). In embodiments have multiple microphones or microphone arrays, the resulting signals can be processed by one of many beam forming techniques as is known in the art.

For each acoustic zone 104 which is supported by a Mic-ICC 124, a subset of Ls-ICC 122 instances can be assigned. It is possible to pass the signal of the corresponding Mic-ICC 124 to N−1 Ls-ICC instances 122 (all other acoustic zones except for the zone of the active speaker). However, it is also possible to assign a subset of Ls-ICC 122 instances. For example in FIG. 2, speech from the driver $110_{FD}$ in acoustic zone $104_{FD}$ is passed to the back seats (zones $104_{RD}$ and $104_{RP}$) but not to the front passenger $110_{FP}$ in zone $104_{FP}$. The dynamic audio routing matrix 120 is configurable. Specific subsets of the N Ls-ICC 122 instances can be assigned to each single Mic-ICC 124. This configuration is usually made before operation when initializing the system. In one embodiment, the initialization and configuration of the sound processing system 100 is performed when the vehicle is started (with ignition). Certain predetermined settings of the configuration are loaded from a separate configuration file or from a parameter file.

The sound processing system 100 has several advantages over conventional systems. The interaction of the different ICC instances is controlled in a single module, the dynamic audio routing matrix 120, making the system more manageable. For each acoustic path from each microphone to each loudspeaker a specific equalizer setting is necessary. Computational requirements are substantially reduced because the dynamic routing matrix 120 only calculates those equalizers which correspond to an active acoustic path at any given time. Thus only N−1 equalizers are calculated instead of M·(N−1) equalizers (where N equals the number of loudspeaker and M equals the number of microphones) in conventional systems. In one embodiment, the dynamic audio routing matrix 120 uses predetermined equalization parameters corresponding to the multiple acoustic zones and vehicle audio system including the vehicle cabin configuration.

Figure 4:
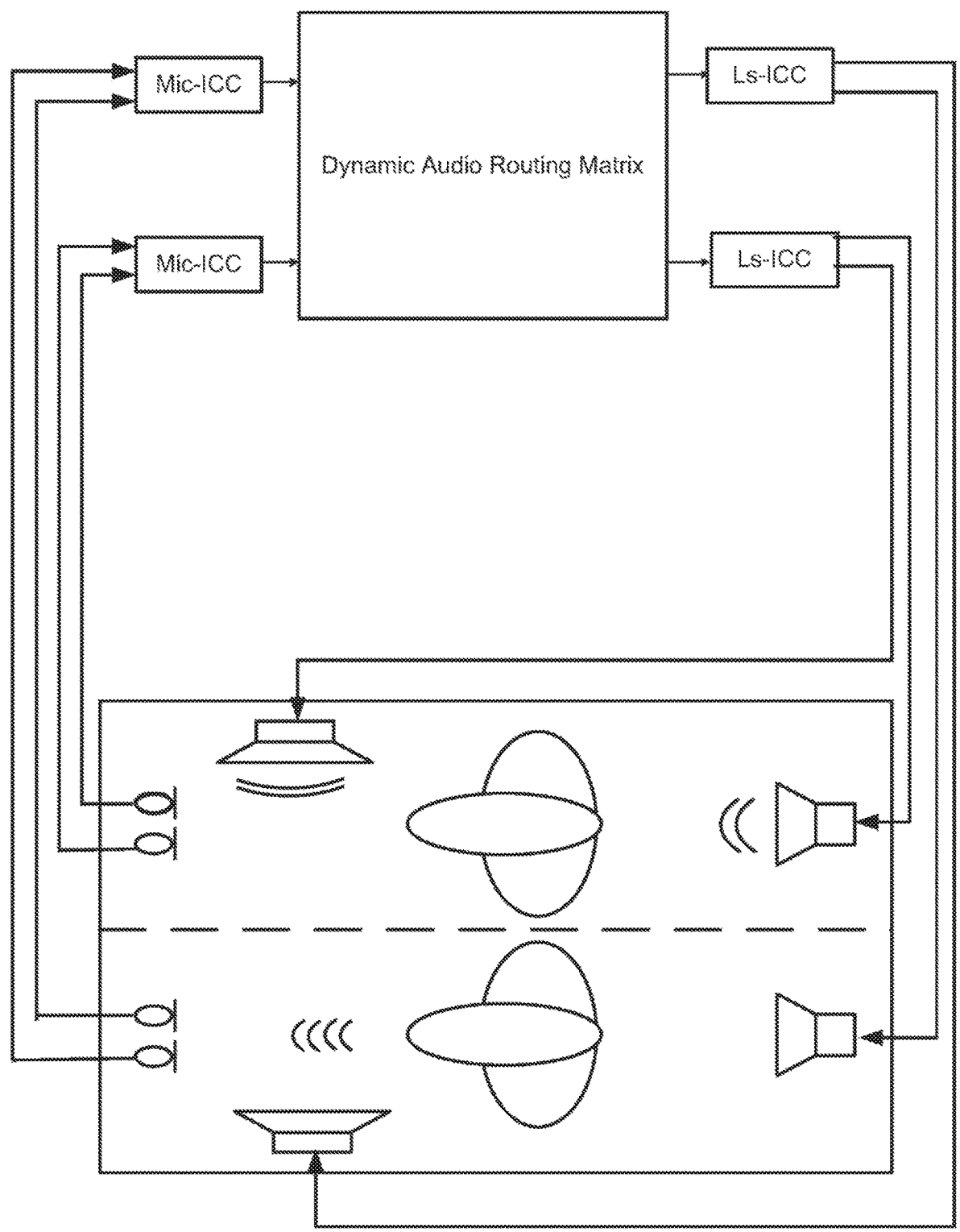
FIG. 4 shows the sound processing system of FIG. 2 implemented for a roadster with rear speakers.

FIG. 4 shows the sound processing system of FIG. 2 implemented for a roadster with rear speakers. For roadsters, communication between driver and co-driver may be supported by assigning one ICC instance to the driver and a second one to the co-driver as shown in FIG. 4. Within each acoustic zone 104 several microphones may be used to capture the speech of the speaker. The loudspeaker or loudspeakers of the other zone are employed to play back the enhanced speech signal. Both instances have to communicate with each other to ensure that only one instance is active. Both scenarios may be realized by two split ICC instances (i.e., Mic-ICC 124 instances and Ls-ICC 122 instances).

In convertibles (not shown) additional acoustic zones are supported due to strong background noises. Microphones and loudspeakers are located as close as possible to the corresponding speaker and listener. Therefore it is advantageous to apply additional split ICC instances (Mic-ICC 124 and Ls-ICC 122) for each passenger separately.

Figure 5:
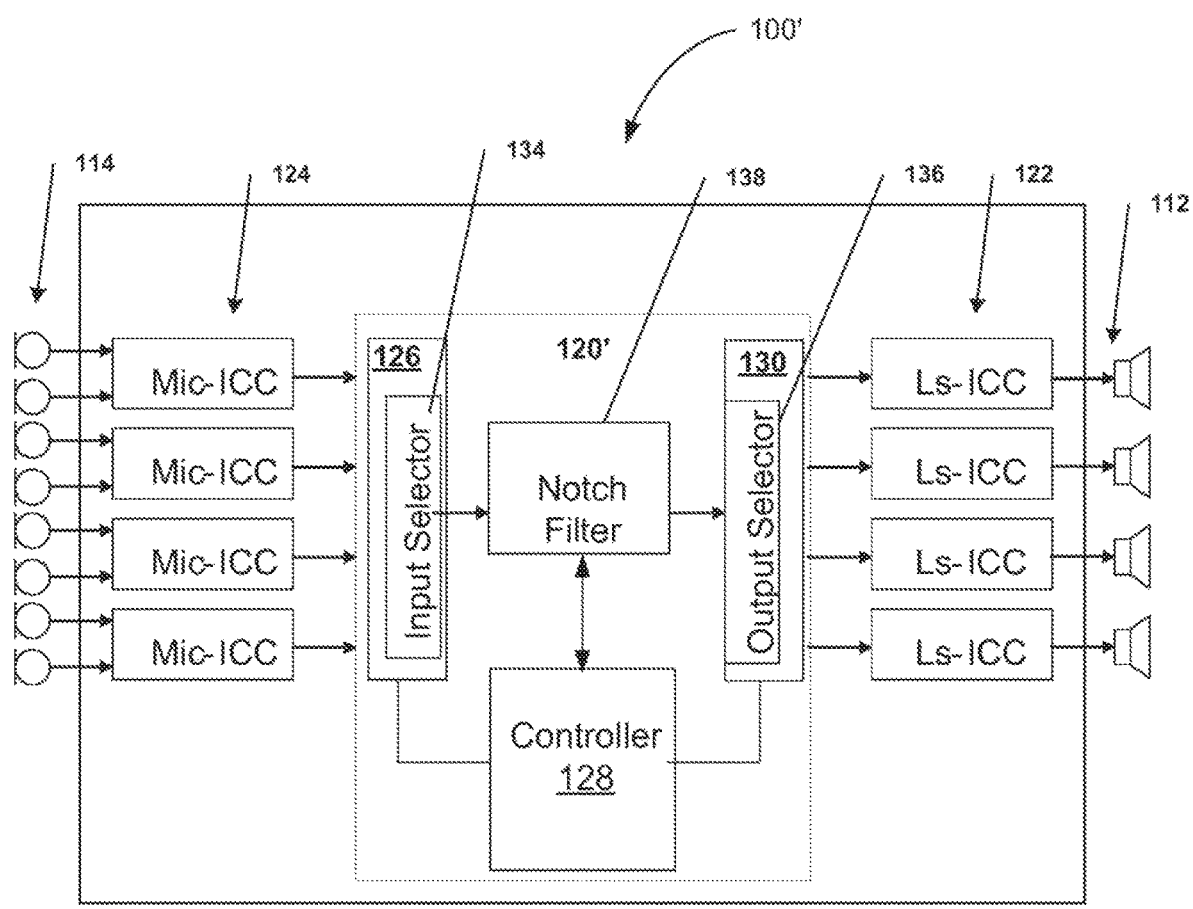
FIG. 5 shows a schematic diagram of an alternate dynamic audio routing matrix of the ICC system of FIG. 2 according to another aspect of the invention.

Now referring to FIG. 5 a sound processing system 100' includes an alternate dynamic audio routing matrix 120' according to another aspect of the invention. The alternate dynamic audio routing matrix 120' includes an input selector 134, and output selector 136 and a notch filter 138.

In operation, the weights of the input selector 134 and output selector 136 are set depending on detected signal activity. In one embodiment, the notch filter 138 is realized as an adaptive filter. The notch filter 138 is designed to suppress sinusoidal components in signals from the plurality of Mic-ICCs 114 selected by input selector 134. Howling artifacts, that might occur in closed electro-acoustic loops, are characterized by sinusoidal components. These sinusoidal components can be suppressed effectively with the notch filter 138.

Another advantage of this architecture is the fact that only one notch filter 138 is needed for feedback suppression. The notch filter 138 ensures stability of the closed-loop of loudspeaker, microphone and ICC system. Conventionally, one notch filter is needed for each instance, and the one to one requirement is computationally expensive. The components in the alternate dynamic audio routing matrix 120' split the Mic-ICC 124 from the Ls-ICC 122 and perform the audio signal routing connecting the active speaker with the listeners. For each loudspeaker, the processed speech signal is pre-equalized and limited in volume. Separating the processing for microphone arrays and loudspeakers avoids the conventional computational overhead. The efficiency of sound processing 100' allows utilization, in some embodiments, of a more complex notch filter compared to conventional systems with replicated instances of ICC systems.

As only one notch filter is needed, the length of the adaptive filter can be chosen larger as more CPU and memory are available. As a result a better frequency resolution can be achieved. Sinusoidal components can be suppressed more effectively with less distortion of the residual signal. A further optimization is the efficient integration of the notch filter 138 into the dynamic audio routing matrix 120'. The notch filter is in general the most expensive algorithm in terms of CPU and memory. Conventionally, the notch filter was calculated in each single ICC instance. In sound processing system 100' the audio routing matrix 120' is split into two vectors: an input selection vector mapped by the input selector 134 from N input channels to one single channel and an output selection vector distributed by the output selector 136 from one single signal to multiple output channels. The notch filter 138 is integrated between the input selector 134 and the output selector 136. In operation, the notch filter is calculated only once instead of N times where N is the number of ICC instances in a conventional system. Instead of a hard selection of input and output within the dynamic routing matrix also smooth weighting factors can be applied (as described above in FIG. 2).

Incorporation of loss control into controller 128 is important to realize a computationally efficient system. In contrast to conventional approaches (e.g. in telephony where the participants of the communication system are spatially separated), here the participants of the communication system are not spatially separated by more than a few meters at most. Therefore, the problem of cross-talk has to be addressed. To separate each participant, time delay and differences in volume may be used to distinguish the microphone signals of the active speaker and to control cross-talk. Here, one acoustic zone is considered to be active using the result of the last signal frame processed. The remaining N−1 zones are assumed to be inactive.

For each zone the power of the processed Mic-ICC signal is calculated by recursive smoothing, in one embodiment. The resulting speech levels are compared within the controller for a threshold decision. The decision is used to increase or decrease the weighting factors which are applied in the output selection. In detail, the speech level of the currently active zone is compared with the speech level of the inactive zone with the second highest score whereas the scores of the inactive zones are compared with the one of the active zone.

Furthermore, the gain of each loudspeaker may be controlled depending on the position of the speaker. When the driver is speaking, the attenuation of the direct sound signal is higher for passenger on the rear seats compared to the co-driver. Therefore, in this case the loudspeakers of the rear passengers require a processing chain with higher gain. The latter may be realized by different settings of the equalizer filters or by different weights of the output distributor.

Figure 6A:
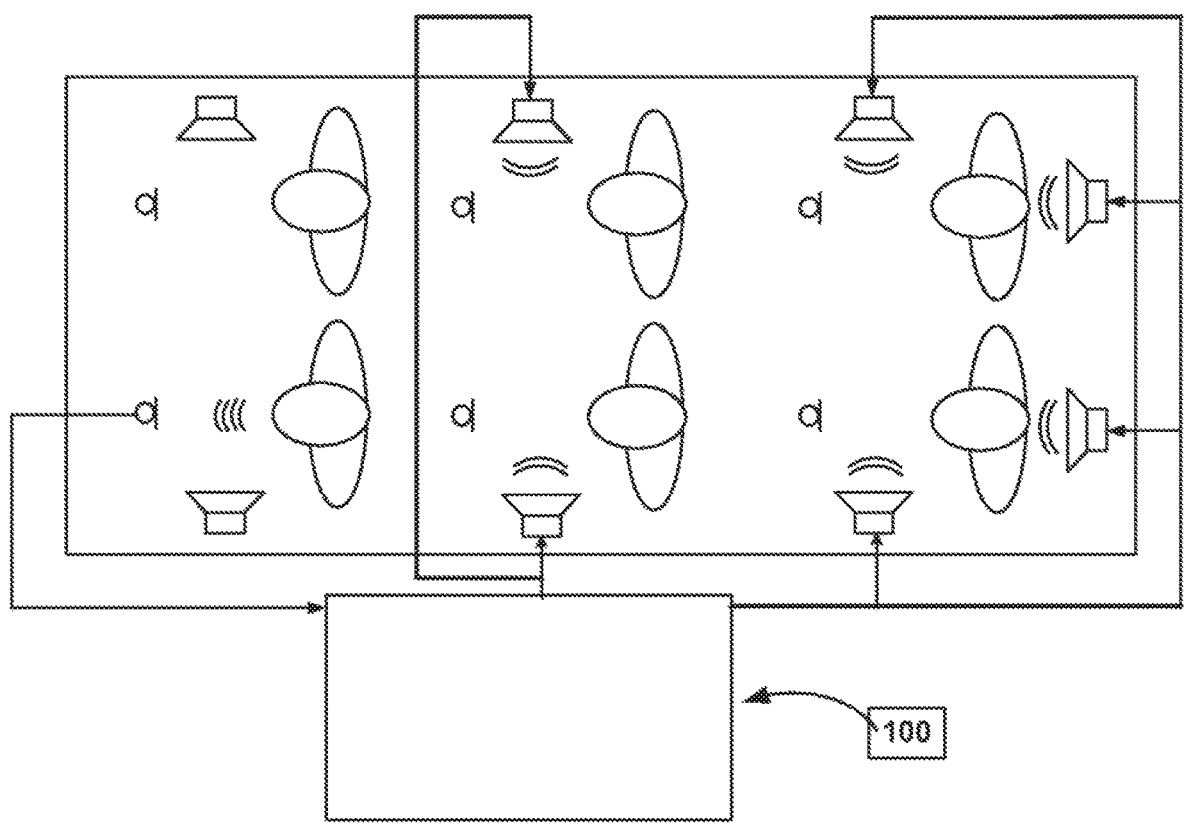
FIG. 6A shows the sound processing system of FIG. 2 implemented for a van with several acoustic zones where the driver communicates with passengers of the second and third row.
Figure 6B:
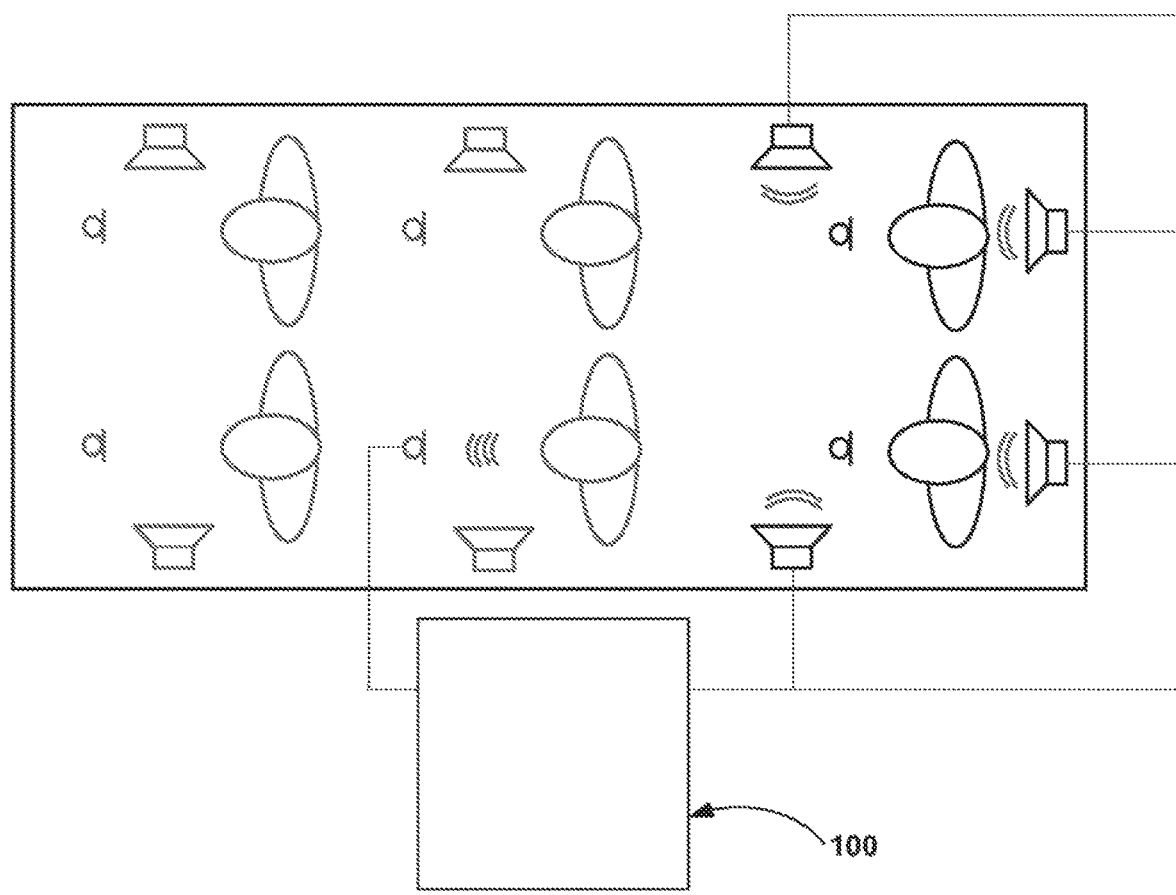
FIG. 6B shows the sound processing system of FIG. 2 implemented for a van in which passengers in the second row communicate with passengers in the third row.
Figure 6C:
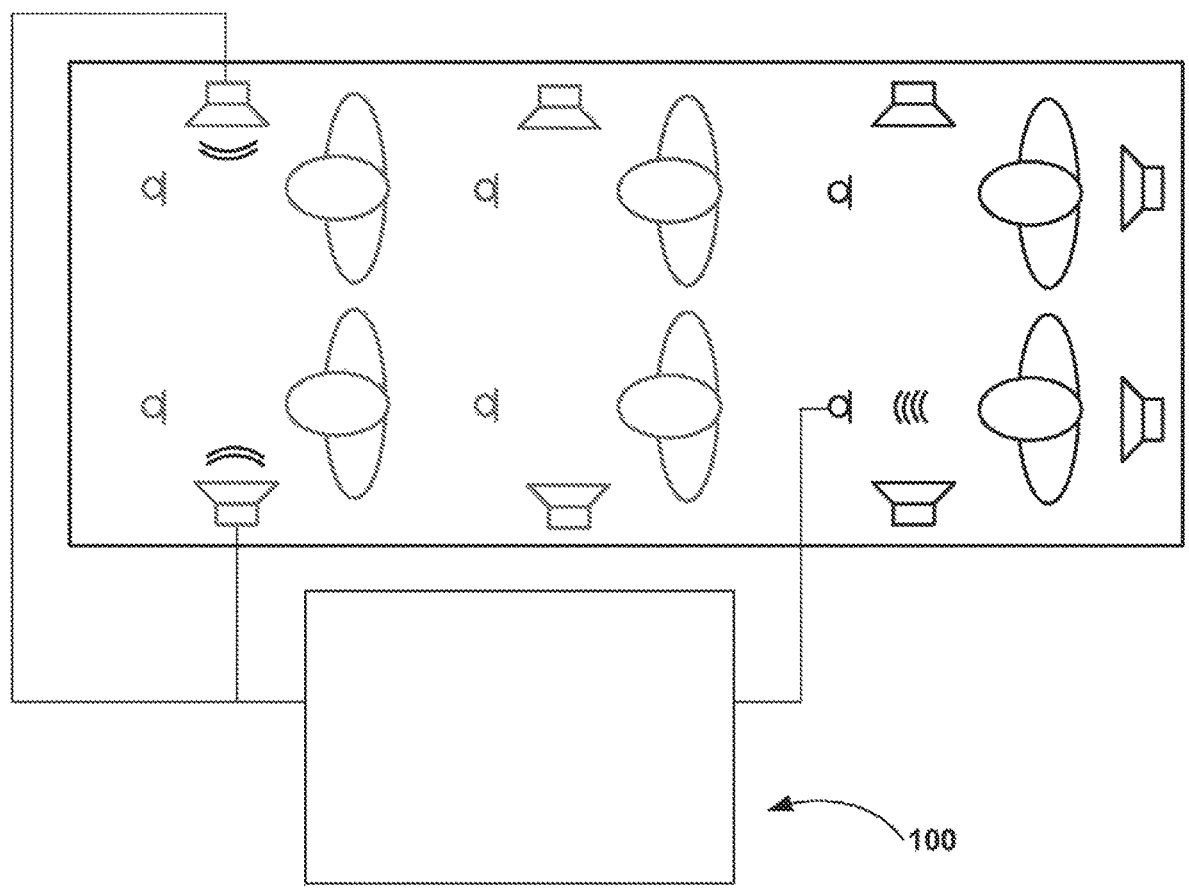
FIG. 6C shows the sound processing system of FIG. 2 implemented for a van in which passengers in the third row communicate with the driver or co-driver.

In other embodiments, the sound processing system is extended to vehicles with more than two seat rows such as vans. In FIGS. 6A-6C the problem of speech communication across three seat rows is shown. Communication with passengers behind the speaker is complicated due to the head orientation of the speaker. Furthermore, communication between the last row and the driver is degraded due to the distance between both seat rows and due to the attenuation of the sound signal caused by the second row. FIG. 6A shows a driver communicating with passengers in the second and third rows of a vehicle, for example a van. FIG. 6B shows the sound processing system of FIG. 2 implemented for a van in which passengers in the second row communicate with passengers in the third row. FIG. 6C shows the sound processing system of FIG. 2 implemented for a van in which passengers in the third row communicate with the driver or co-driver.

The scenarios shown in FIGS. 6A-6C are challenging with respect to computational complexity and audio signal routing. Using several unidirectional ICC instances as in a conventional solution may be too complex since memory consumption and computational overhead is multiplied by the number of instances (N). Each microphone signal is processed separately and equalizing is calculated for N·(N−1) communication channels irrespective whether the speech signal is passed through or blocked by the loss control function.

Figure 7:
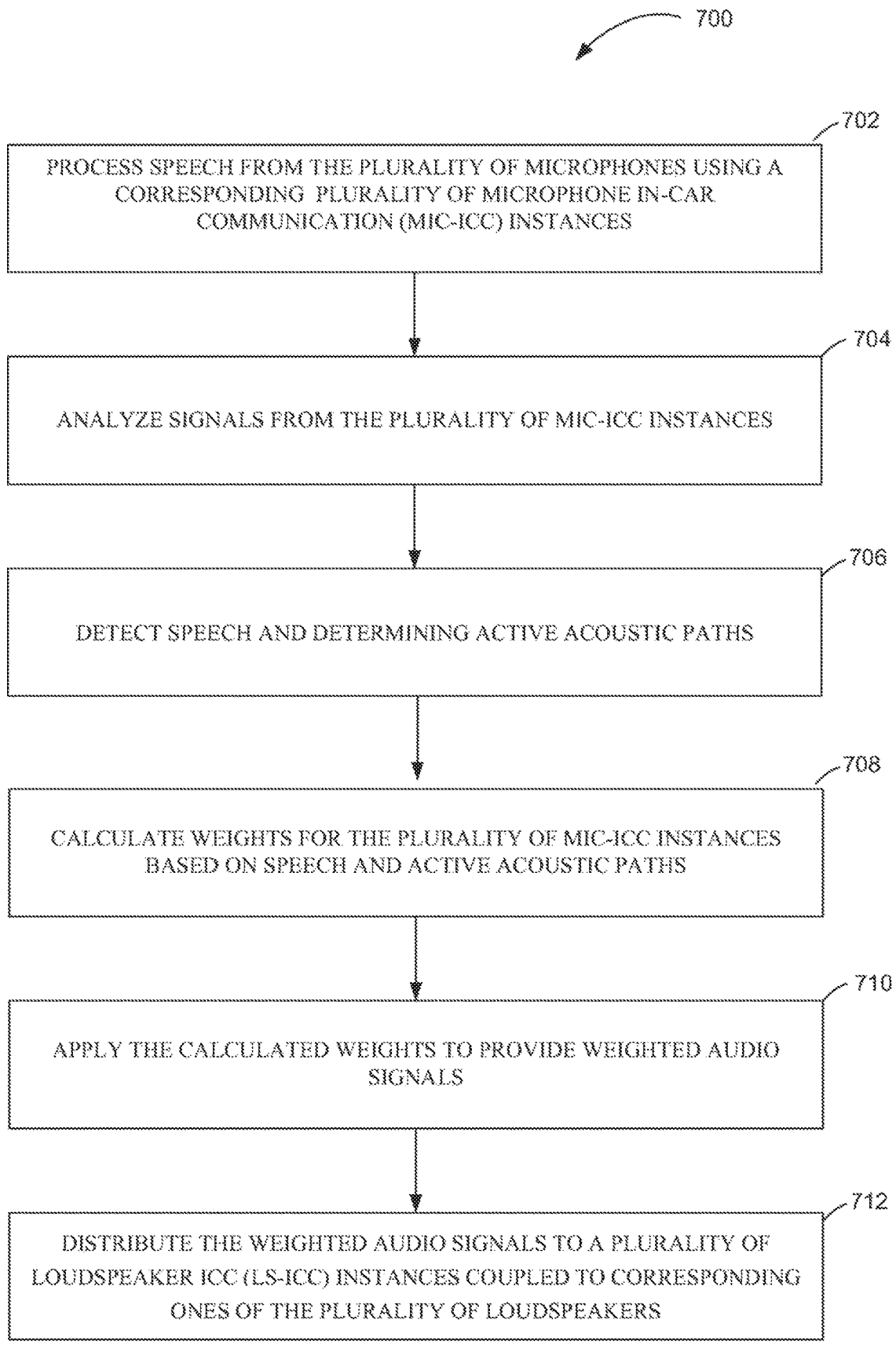
FIG. 7 shows a flow diagram for the operation of the sound processing system according to one aspect of the invention.

Now referring to FIG. 7, a flow diagram 700 details the operation of system for providing improved speech intelligibility in a vehicle having a plurality of microphones and a plurality of loudspeakers distributed in multiple acoustic zones. In step 702, speech from the plurality of microphones is processed using a corresponding plurality of microphone In-Car Communication (Mic-ICC) instances. In step 704, signals from the plurality of Mic-ICC instances are analyzed in the mixer 126 and controller 128. Speech is detected and active acoustic paths are determined by the controller in step 706.

In step 708, the controller calculates weights for the plurality of Mic-ICC instances based on speech and active acoustic paths, and the calculated weights are applied, in step 710, to provide weighted audio signals. The weighted audio signals are distributed to a plurality of loudspeaker ICC (Ls-ICC) instances coupled to the corresponding plurality of loudspeakers in step 712.

In another embodiment, signal activity is detected on the basis of the input signals, and the weights are changed dynamically depending on signal activity. Using the weights, the active acoustic paths are determined and equalizers need only be calculated for the active acoustic paths. In order to reduce echo artifacts, the signal delay from the plurality of microphones to the plurality of loudspeakers distributed in multiple acoustic zones is kept to less than about 10 ms.

In yet another embodiment, speaker activity is detected in order to determine active acoustic paths. The sound processing system 100 can interface with an on-board computer via a CAN bus or other equivalent systems to obtain further information about passengers in the vehicle. For example, it is possible to determine whether there are passengers in various seats in the vehicle and to determine vehicle speed and then adjust the playback level for each Ls-ICC 122 instance as a function of vehicle speed.

In another aspect of the invention, the sound processing system estimates the background noise level for each of the multiple acoustic zones and adjusts the playback level in the distributor for each Ls-ICC 122 instance as a function of estimated background noise level in corresponding ones of the multiple acoustic zones.

In a conventional unidirectional ICC the level of the background noise is typically estimated on the basis of a microphone signal and the output signal is amplified by a gain factor that depends on this estimated noise level. For example, for high noise levels the amplification gain of the ICC is higher than for low noise level environments. However, in conventional systems, the noise estimate is not based on the listener's position but instead to the speaker's position (as it is estimated from the microphone signal).

In bidirectional systems or in multi-zone systems as implemented in embodiments described herein, the noise levels at the listeners' positions are measured where the acoustic zones of the listeners are equipped with microphones (in general, there is a Mic-ICC and a LS-ICC for each acoustic zone). In these cases the controller 128 in conjunction with the mixer 126 receives the noise estimates from the Mic-ICCs or it determines a noise estimate on the basis of the Mic-ICC output signals. Based on these noise estimates, amplification factors for the loudspeaker signals of the corresponding acoustic zone are determined. These amplification factors are applied within the distributor, for example, by multiplying with the original weighting factors to get final weighting factors.

The controller 128 receives signals and additional information, from all Mic-ICC 124 instances. The additional information includes but is not limited to estimates of the background noise level that are based on the unprocessed microphone signals and signals that are preprocessed in a special way (e.g., using spectral estimates available from noise reduction processing to calculate a signal-to-noise ratio which can be used for speech activity detection). Weights of the mixer 126 and the distributor 130 are set depending on detected signal activity.

Alternative methods for speech activity detection are possible in conjunction with the system. For example, visual information from a camera can be used to detect speech activity. Furthermore, sensors (pressure, optical, belt buckle sensors) may provide information about which seats in the vehicle are occupied. This information may be considered in the speech activity detection. Some of this information can be obtained through the interface on board computer via the CAN bus to determine whether there are passengers in various seats and to receive a determination or vehicle speed.

Figure 8:
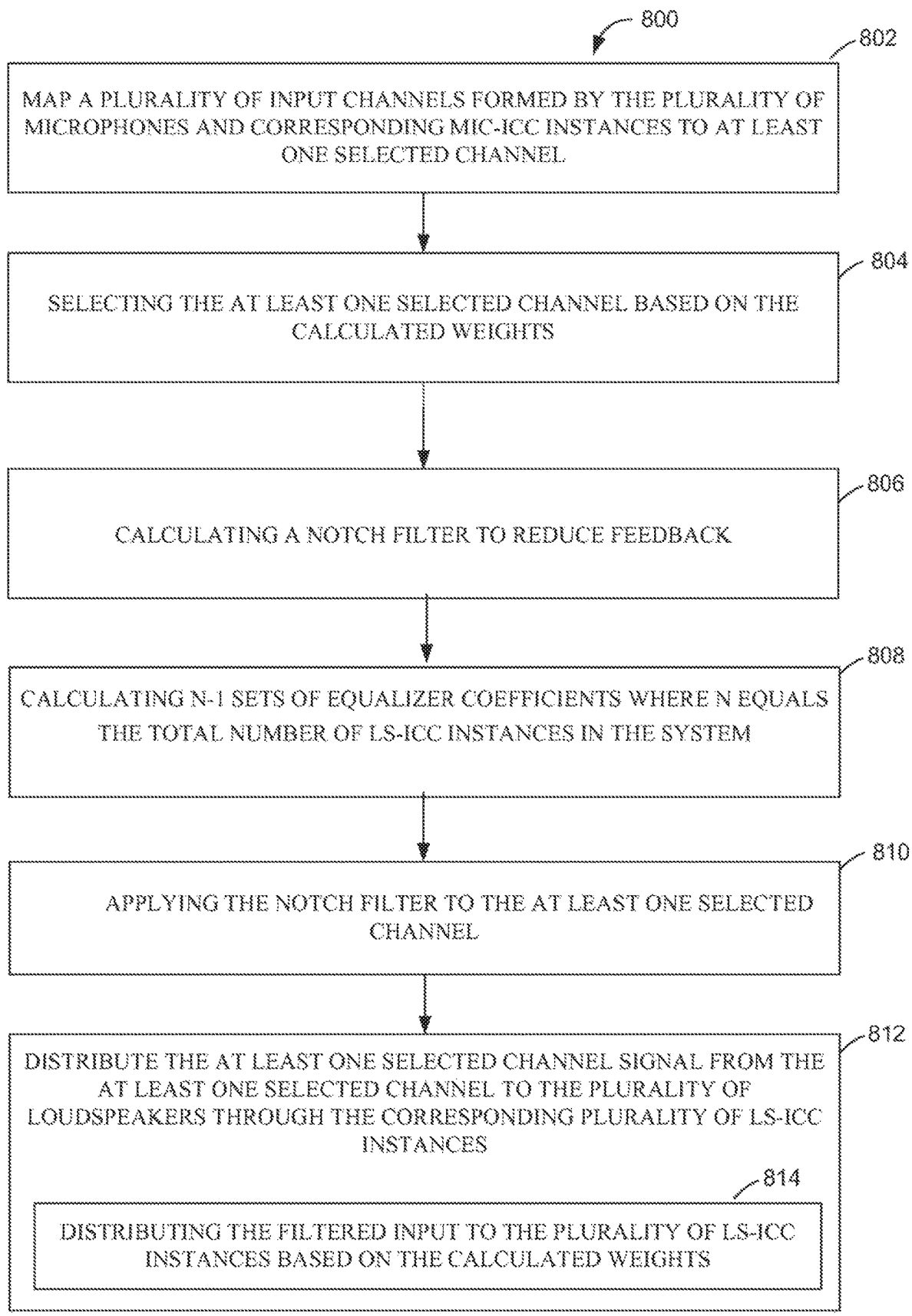
FIG. 8 shows a flow diagram for the operation of the controller within the dynamic audio routing matrix of FIG. 5 having an input and output selector.

Now referring to FIG. 8, a flow diagram 800 illustrates further details of the sound processing system 100' of FIG. 5. In step 802, the input selector in conjunction with the mixer maps the input channels formed by the plurality of microphones and corresponding Mic-ICC instances to a selected channel. In step 804, the controller selects at least one selected channel based on the calculated weights determined by the mixer.

In step 806, the controller calculates a notch filter to reduce feedback. The controller calculates N−1 sets of equalizer coefficients where N equals the total number of Ls-ICC instances in the system in step 808. The notch filter is applied to at least one selected channel in step 810. The equalized signals are distributed to the plurality of loudspeakers through the corresponding plurality of Ls-ICC instances in step 812. In one embodiment, the filtered input from at least one selected channel is distributed to the corresponding plurality of Ls-ICC instances in step 814. In one embodiment, the input selector selects a single channel.

Depending on the vehicle type and the intended application different requirements have to be fulfilled by a speech communication system. For sedans, for example, it may be sufficient to support the communication between driver/co-driver and passengers on the rear seats. In this case the automobile may be divided into four acoustic zones as shown in FIG. 2. In other embodiments the automobile may be divided into two acoustic zones.

Those skilled in the art should readily appreciate that the programs and methods for processing signals in a ICC system as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for processing sound signals in an ICC system has been particularly shown and described with references to embodiments thereof, it will be understood by those skilled in the art that various changes in form and details may be made therein without departing from the scope of the invention encompassed by the appended claims.

What is claimed is:

1. A sound processing system, comprising:
a plurality of microphone instances to receive audio signals from corresponding ones of the plurality of microphones, each of which is configured to receive sound from a corresponding one of a plurality of acoustic zones, wherein a number of the acoustic zones is at least three;
a plurality of loudspeaker instances to generate signals for corresponding ones of loudspeakers, each of which is configured to transmit sound into a corresponding one of the plurality of acoustic zones; and
a routing matrix to provide signal paths from at least one of the microphone instances to at least two of the loudspeaker instances,
wherein the routing matrix is configured to determine an active one of the microphone instances and make inactive the loudspeaker instance for the acoustic zone corresponding to the active microphone instance,
the routing matrix further configured to determine an equalizer setting from each path from each active one of the microphones to each active one of the loudspeakers such that a number of equalizer settings is one less than a number of loudspeakers, and
wherein the routing matrix is further configured to suppress microphone signals from non-active ones of the zones.

2. The system according to claim 1, wherein the microphone instances are configured to perform one or more of high pass filtering, beamforming, noise reduction, and/or gain control.

3. The system according to claim 1, wherein the loudspeaker instances are configured to scale play back level based on a level of background noise.

4. The system according to claim 1, wherein a number of the microphone instances equals a number of the loudspeaker instances.

5. The system according to claim 1, further including forming specific subsets of the loudspeaker instances for each of the microphone instances.

6. The system according to claim 1, wherein the routing matrix includes a notch filter configured to suppress substantially sinusoidal components in signals from the microphone instances.

7. The system according to claim 6, wherein the notch filter is the only notch filter in the routing matrix.

8. The system according to claim 1, wherein vehicle speed is used to determine the equalizer settings.

9. The system according to claim 1, wherein the acoustic zones are formed within a vehicle.

10. A method, comprising:
receiving audio signals from a plurality of microphones at a corresponding one of a plurality of microphone instances, wherein each of the microphones is configured to receive sound from a corresponding one of a plurality of acoustic zones, wherein a number of the acoustic zones is at least three;
generating signals, by a plurality of loudspeaker instances, for corresponding ones of loudspeakers, each of which is configured to transmit sound into a corresponding one of the plurality of acoustic zones;
routing of signal paths from at least one of the microphone instances to at least two of the loudspeaker instances by determining an active one of the microphone instances and making inactive the loudspeaker instance for the acoustic zone corresponding to the active microphone instance; and
determining an equalizer setting from each path from each active one of the microphones to each active one of the loudspeakers such that a number of equalizer settings is one less than a number of loudspeakers.

11. The method according to claim 10, wherein the microphone instances are configured to perform one or more of high pass filtering, beamforming, noise reduction, and/or gain control.

12. The method according to claim 10, wherein the loudspeaker instances are configured to scale play back level based on a level of background noise.

13. The method according to claim 10, wherein a number of the microphone instances equals a number of the loudspeaker instances.

14. The method according to claim 10, further including forming specific subsets of the loudspeaker instances for each of the microphone instances.

15. The method according to claim 10, wherein the routing matrix includes a notch filter configured to suppress substantially sinusoidal components in signals from the microphone instances.

16. The method according to claim 15, wherein the notch filter is the only notch filter in the routing matrix.

17. The method according to claim 10, wherein a number of the acoustic zones is at least four.

18. The method according to claim 10, wherein the microphone instances are configured to perform one or more of beamforming, noise reduction, and/or gain control.

19. A sound processing system, comprising:

first, second, third and fourth microphone instances to receive audio signals from corresponding ones of the plurality of microphones, each of which is configured to receive sound from a corresponding one of a plurality of acoustic zones, wherein a number of the acoustic zones is at least three;

first, second, third, and fourth loudspeaker instances to generate signals for corresponding ones of loudspeakers, each of which is configured to transmit sound into a corresponding one of the plurality of acoustic zones; and a routing matrix to provide signal paths from at least one of the first, second, third, and fourth microphone instances to at least two of the first, second, third, and fourth loudspeaker instances, wherein the routing matrix is configured to determine an active one of the first, second, third, and fourth microphone instances and make inactive one of the first, second, third, and fourth loudspeaker instance for the acoustic zone corresponding to the active microphone instance, the routing matrix further configured to determine an equalizer setting from each path from each active one of the first, second, third, and fourth microphones to each active one of the first, second, third, and fourth loudspeakers such that a number of equalizer settings is one less than a number of loudspeakers.

* * * * *